US012686356B2

(12) United States Patent
Miyamoto

(10) Patent No.: US 12,686,356 B2
(45) Date of Patent: Jul. 21, 2026

(54) GAS GENERATOR AND GAS DISCHARGE METHOD FOR GAS GENERATOR

(71) Applicant: Daicel Corporation, Osaka (JP)

(72) Inventor: Tomoharu Miyamoto, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 28 days.

(21) Appl. No.: 19/003,120

(22) Filed: Dec. 27, 2024

(65) Prior Publication Data

US 2025/0145105 A1 May 8, 2025

Related U.S. Application Data

(63) Continuation of application No. PCT/JP2023/024003, filed on Jun. 28, 2023.

(30) Foreign Application Priority Data

Jun. 28, 2022 (JP) ................................ 2022-103652
Jun. 28, 2023 (JP) ................................ 2023-105774

(51) Int. Cl.
*B60R 21/264* (2006.01)
*B60R 21/26* (2011.01)

(52) U.S. Cl.
CPC . *B60R 21/2644* (2013.01); *B60R 2021/26011* (2013.01); *B60R 2021/2648* (2013.01)

(58) Field of Classification Search
CPC ....... B60R 21/2644; B60R 2021/26011; B60R 2021/2648

(Continued)

(56) References Cited

U.S. PATENT DOCUMENTS 5,806,885 A * 9/1998 Hock .................... B60R 21/264
280/741
6,170,869 B1 1/2001 Tomiyama
(Continued)

FOREIGN PATENT DOCUMENTS

DE 102017128886 A1 6/2019
DE 102019131394 A1 5/2021
(Continued)

OTHER PUBLICATIONS

International Search Report (PCT/ISA/210) issued Sep. 5, 2023 in International Patent Application No. PCT/JP2023/024003 with English translation thereof.
(Continued)

*Primary Examiner* — Samir Abdosh
(74) *Attorney, Agent, or Firm* — XSENSUS LLP

(57) ABSTRACT

A gas generator includes an igniter, a gas generating agent that generates a combustion gas by being combusted, a housing that accommodates the igniter and the gas generating agent inside the housing, the housing including an inner surface, a gas discharge port penetrating through the housing from an inside to an outside of the housing, the gas discharge port including a chamfered region in which a corner portion of an opening of the gas discharge port on the inner surface is removed over an entire circumference of the opening, and a seal attached to the inner surface of the housing, closes, before the actuation of the igniter, the gas discharge port by covering the opening of the gas discharge port on the inner surface of the housing, and opens the gas discharge port by being ruptured due to reception of a pressure of the combustion gas.

17 Claims, 12 Drawing Sheets

(58) Field of Classification Search
USPC ......................................................... 102/530
See application file for complete search history.

(56) References Cited

U.S. PATENT DOCUMENTS

| | | | | |
|---|---|---|---|---|
| 6,206,417 B1* | 3/2001 | Soderquist | ........... | B60R 21/261 |
| | | | | 280/736 |
| 6,324,760 B1 | 12/2001 | Tomiyama | | |
| 6,324,987 B1* | 12/2001 | Wier | .......... | F42B 3/28 |
| | | | | 280/741 |
| 8,720,944 B2* | 5/2014 | Kobayashi | .......... | B60R 21/2644 |
| | | | | 280/736 |
| 2003/0137139 A1* | 7/2003 | Iwai | .................... | B60R 21/2644 |
| | | | | 280/741 |
| 2003/0173761 A1* | 9/2003 | Rink | .................... | B60R 21/261 |
| | | | | 280/736 |
| 2005/0110254 A1* | 5/2005 | Engler | ............... | B60R 21/2644 |
| | | | | 280/736 |
| 2013/0312632 A1* | 11/2013 | Ukita | ....................... | C06D 5/00 |
| | | | | 102/530 |
| 2014/0096697 A1* | 4/2014 | Okuyama | ............... | C06D 5/00 |
| | | | | 102/530 |
| 2016/0121841 A1* | 5/2016 | Katsuta | ................. | B60R 21/264 |
| | | | | 102/530 |

FOREIGN PATENT DOCUMENTS

| | | | |
|---|---|---|---|
| DE | 102019134899 A1 | 6/2021 | |
| JP | H10-217899 A | 8/1998 | |
| JP | 2013-241102 A | 12/2013 | |
| JP | 2021-079950 A | 5/2021 | |
| WO | 2009014915 A1 | 1/2009 | |

OTHER PUBLICATIONS

Written Opinion of the International Searching Authority (PCT/ISA/237) issued Sep. 5, 2023 in International Patent Application No. PCT/JP2023/024003 with English translation thereof.
International Search Report (PCT/ISA/210) issued Apr. 18, 2023 in International Patent Application No. PCT/JP2023/003071 with English translation thereof.
Written Opinion of the International Searching Authority (PCT/ISA/237) issued Apr. 18, 2023 in International Patent Application No. PCT/JP2023/003071 with English translation thereof.

\* cited by examiner

| | LARGE HOLE | | SMALL HOLE | | COMBUSTION RESIDUE AMOUNT [mg] | |
| --- | --- | --- | --- | --- | --- | --- |
| | Φ1 [mm] | NUMBER [PIECES] | Φ1 [mm] | NUMBER [PIECES] | SIMULTANEOUS IGNITION | DELAYED IGNITION |
| EXAMPLE | 3.25 | 6 | 2.05 | 14 | 1137 | 1023 |
| COMPARATIVE EXAMPLE | 3.00 | 6 | 1.90 | 14 | 1443 | 1230 |

FIG. 11

| NO. | Φ [mm] | X [mm] | P [%] | RUPTURED STATE |
|---|---|---|---|---|
| 1 | 3.0 | 0.05 | 1.7 | SHEAR |
| 2 | 1.9 | 0.05 | 2.6 | SHEAR |
| 3 | 3.5 | 0.1 | 2.9 | FRACTURE |
| 4 | 3.25 | 0.1 | 3.1 | FRACTURE |
| 5 | 3.0 | 0.1 | 3.3 | FRACTURE |
| 6 | 2.5 | 0.1 | 4.0 | FRACTURE |
| 7 | 2.05 | 0.1 | 4.9 | FRACTURE |
| 8 | 2.0 | 0.1 | 5.0 | FRACTURE |
| 9 | 1.9 | 0.1 | 5.3 | FRACTURE |
| 10 | 3.0 | 0.2 | 6.7 | FRACTURE |
| 11 | 1.5 | 0.1 | 6.7 | FRACTURE |
| 12 | 3.0 | 0.3 | 10.0 | FRACTURE |
| 13 | 3.0 | NONE | - | SHEAR |
| 14 | 1.9 | NONE (PRESS PUNCHING) | - | SHEAR |

FIG. 12

GAS GENERATOR AND GAS DISCHARGE METHOD FOR GAS GENERATOR

CROSS-REFERENCE TO RELATED APPLICATIONS

The present application is a Continuation of International Patent Application No. PCT/JP2023/024003 filed on Jun. 28, 2023, which contains subject matter related to Japanese Patent Application No. 2022-103652 and 2023-105774 filed in the Japan Patent Office on Jun. 28, 2022 and Jun. 28, 2023 respectively. The entire contents of each are incorporated herein by reference.

TECHNICAL FIELD

The present invention relates to a gas generator and a gas discharge method for a gas generator.

BACKGROUND ART

Typically, a gas generator is widely used in which an igniter and a gas generating agent are disposed in a housing, the gas generating agent is combusted by activating the igniter, and the combustion gas is discharged to the outside from one or more gas discharge ports formed in the housing.

The gas generator is configured such that the inside of the housing is maintained airtight before actuation by closing the gas discharge port with a closing member such as a seal tape, and after actuation, the closing member is ruptured by a pressure of the combustion gas to open the gas discharge port. In relation to this, there is known a technique of closing the gas discharge port with a moisture-proof seal tape that can prevent the gas generating agent from absorbing moisture (for example, Patent Document 1).

CITATION LIST

Patent Document

Patent Document 1: JP 10-217899 A

SUMMARY OF INVENTION

Technical Problem

Incidentally, the combustion gas generated in the housing and reaching the gas discharge port may contain a residue (combustion residue) generated by combustion. In the gas generator, the combustion residue is desirably not discharged to the outside of the gas generator as much as possible.

An object of a technique of the present disclosure is to reduce an amount of combustion residues discharged to the outside of a gas generator.

Solution to Problem

To solve the above problem, the technique of the present disclosure adopts the following configuration. That is, an overview of the technique of the present disclosure is as follows.

[1]

A technique according to an embodiment of the present disclosure is a gas generator including an igniter, a gas generating agent that generates a combustion gas by being combusted in response to actuation of the igniter, a housing accommodating the igniter and the gas generating agent inside the housing, a gas discharge port penetrating through the housing from an inside to an outside of the housing, and a seal made of a metal and formed in a sheet shape, the seal being attached to an inner surface of the housing and being configured to close, before the actuation of the igniter, the gas discharge port by covering an opening of the gas discharge port on an inner surface side of the housing and open the gas discharge port by being ruptured due to reception of a pressure of the combustion gas generated by the actuation of the igniter. The gas discharge port includes a chamfered region in which a corner portion of the opening on the inner surface side of the housing is removed over an entire circumference of the opening.

[2]

In the gas generator according to [1], the chamfered region may be formed in such a manner to be reduced in diameter with increasing distance from the opening on the inner surface side of the housing in a thickness direction of the housing.

[3]

In the gas generator according to [1] or [2], an inner wall surface of the chamfered region may be formed in a linear shape or a curved shape in a cross section along a thickness direction of the housing.

[4]

In the gas generator according to any one of [1] to [3], the gas discharge port may include a straight region continuous with the chamfered region and extending with a constant inner diameter.

[5]

In the gas generator according to any one of [1] to [4], the seal may include a substrate layer made of aluminum, and a bonding layer provided on one surface of the substrate layer and configured to adhere to the inner surface of the housing, and a thickness of the substrate layer may be equal to or more than 50 [μm] and equal to or less than 200 [μm].

[6]

In the gas generator according to [5], the seal may have a tensile strength equal to or more than 100 [N]/20 [mm] and equal to or less than 200 [N]/20 [mm] when the tensile strength is measured in accordance with JIS Z0237.

[7]

In the gas generator according to [5] or [6], the seal may further include an adhesive layer provided on the other surface of the substrate layer and having adhesion.

[8]

In the gas generator according to any one of [1] to [7], the gas generator is configured such that, when the seal is ruptured, at least a part of the seal may remain in the gas discharge port.

[9]

In the gas generator according to any one of [1] to [8], the gas generator is configured such that, by the seal being ruptured, a minimum flow path cross-sectional area of a flow path for the combustion gas formed in the gas discharge port may become smaller than a minimum cross-sectional area of the gas discharge port.

[10]

A technique according to an embodiment of the present disclosure is a gas discharge method for a gas generator including preparing a housing of the gas generator, the housing accommodating, inside the housing, an igniter and a gas generating agent that generates a combustion gas by being combusted in response to actuation of the igniter, the housing including a gas discharge port penetrating through the housing from an inside to an outside of the housing, the gas discharge port including a chamfered region in which a corner portion of an opening on an inner surface side of the housing is removed over an entire circumference of the opening, closing the gas discharge port by attaching a seal made of a metal and formed in a sheet shape to an inner surface of the housing and by covering the opening of the gas discharge port on the inner surface side of the housing, assembling the gas generator, activating the igniter, and rupturing the seal in such a manner that at least a part of the seal remains at the gas discharge port by pressing the seal against an inner wall surface of the chamfered region with a pressure of the combustion gas generated in response to the actuation of the igniter and by rupturing a region of the seal that is on an inner side of a contact region of the seal, the contact region being in contact with the inner wall surface of the chamfered region.

[11]

In the gas discharge method according to [10], in the preparing the housing, the chamfered region may be formed, in the gas discharge port, in such a manner to be reduced in diameter with increasing distance from the opening on the inner surface side of the housing in a thickness direction of the housing, and in the rupturing the seal, the seal may be bent in such a manner to conform to the inner wall surface of the chamfered region and thus be ruptured.

[12]

In the gas discharge method according to or [11], in the preparing the housing, the inner wall surface of the chamfered region may be formed in a linear shape or a curved shape in a cross section along a thickness direction of the housing.

[13]

In the gas discharge method according to any one of to [12], in the preparing the housing, a straight region may be formed in the gas discharge port, the straight region opening to an outer surface of the housing and extending with a constant inner diameter, and in the rupturing the seal, the seal may be bent and ruptured, and thus at least a part of the seal reaches the straight region.

[14]

In the gas discharge method according to any one of to [13], in the rupturing the seal, the seal may be bent and ruptured such that a minimum flow path cross-sectional area of a flow path for the combustion gas formed in the gas discharge port becomes smaller than a minimum cross-sectional area of the gas discharge port.

[15]

In the gas discharge method according to any one of to [14], in the closing the gas discharge port, the gas discharge port may be closed with the seal, the seal including a substrate layer made of aluminum and a bonding layer provided on one surface of the substrate layer and configured to adhere to the inner surface of the housing.

[16]

In the gas discharge method according to any one of to [15], a plurality of the gas discharge ports may be formed in the housing, in the assembling the gas generator, a filter having a tubular shape may be disposed inside the housing such that an annular space may be formed between the filter and the inner surface of the housing, and in the rupturing the seal, the pressure may be applied on the seal while the pressure in the annular space is made uniform by introducing the combustion gas into the annular space, the combustion gas being generated by the actuation of the igniter and passed through the filter.

[17]

In the gas discharge method according to any one of to [16], in the rupturing the seal, the seal may be stretched by the pressure of the combustion gas, and the seal may be bent and ruptured while at least a part of the seal remains in the gas discharge port.

Advantageous Effects of Invention

According to the technique of the present disclosure, it is possible to reduce an amount of combustion residues discharged to the outside of the gas generator.

BRIEF DESCRIPTION OF DRAWINGS

FIG. 11 is a table showing results of a combustion residue amount measurement test.

FIG. 12 is a table showing results of a chamfering percentage evaluation test.

DESCRIPTION OF EMBODIMENTS

A gas generator according to an embodiment of the present disclosure will be described below with reference to the drawings. In the following embodiment, an aspect where a technique according to an embodiment of the present disclosure is applied to a gas generator for an airbag (inflater) will be described. However, the application of the technique according to the present disclosure is not limited thereto. For example, the technique may be applied to a gas generator for a seat belt retractor.

The configurations, combinations thereof, and the like in each embodiment are examples, and various additions, omissions, substitutions, and other changes may be made as appropriate without departing from the spirit of the present invention. The present disclosure is not limited by the embodiments, but only limited by the claims. Note that in this specification, "chamfering" means removing a corner portion of a member, and includes chamfering, which is so-called C chamfering, and round chamfering, which is so-called R chamfering.

Figure 1:
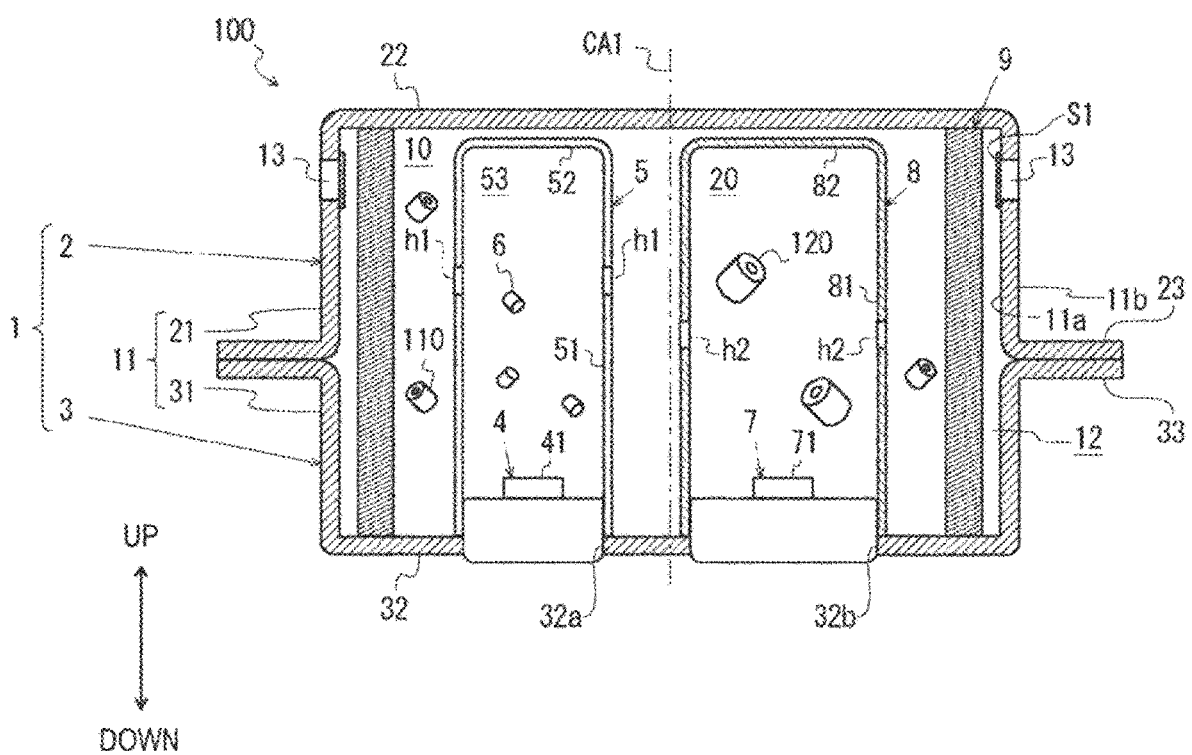
FIG. 1 is a longitudinal cross-sectional view illustrating a state of a gas generator before actuation according to an embodiment.

FIG. 1 is a longitudinal cross-sectional view illustrating a state of a gas generator 100 before actuation according to the embodiment. FIG. 1 illustrates a cross section along a center axis of a housing 1, and the center axis is indicated by a reference sign CA1. The gas generator 100 according to the present embodiment is configured as a so-called dual type gas generator including two igniters. However, the technique according to the present disclosure is not limited to such a configuration. In other words, the gas generator according to the present disclosure is required to include one or more igniters. The applied gas generator may be a single type gas generator provided with only one igniter, or may be a gas generator provided with three or more igniters.

Overall Configuration

As illustrated in FIG. 1, the gas generator 100 includes a first ignition device 4, a first inner tube member 5, a transfer charge 6, a second ignition device 7, a second inner tube member 8, a filter 9, a first gas generating agent 110, a second gas generating agent 120, the housing 1 that accommodates these constituent elements, a plurality of gas discharge ports 13 penetrating through the housing 1 from the inside to the outside of the housing 1, and a seal tape S1 that seals the plurality of gas discharge ports 13. The gas generator 100 is configured to activate a first igniter 41 included in the first ignition device 4 to combust the first gas generating agent 110, to activate a second igniter 71 included in the second ignition device 7 to combust the second gas generating agent 120, and to discharge a combustion gas, which is a combustion product of these gas generating agents, from the plurality of gas discharge ports 13 formed in the housing 1. Here, a direction along the center axis CA1 of the housing 1 is defined as an up-down direction of the gas generator 100, an upper shell side indicated by a reference sign 2 (that is, an upper side in FIG. 1) is defined as an upper side of the gas generator 100, and a lower shell side indicated by a reference sign 3 (that is, a lower side in FIG. 1) is defined as a lower side of the gas generator 100. Hereinafter, each configuration of the gas generator 100 will be described. Note that in the present specification, the activation of the igniter included in the ignition device may be expressed as "activation of the ignition device" or "activation of the gas generator" for convenience.
Housing An upper shell 2 and a lower shell 3 each made of a metal and formed into a bottomed substantially cylindrical shape are joined in a state where respective open ends face each other. Thus, the housing 1 is formed in a short cylindrical shape that includes a tubular peripheral wall portion denoted by a reference sign 11 and in which both ends of the peripheral wall portion 11 in an axial direction are closed. The center axis CA1 in FIG. 1 is a center axis of the peripheral wall portion 11.

The upper shell 2 includes an upper peripheral wall portion 21 having a tubular shape and a top plate portion 22 that closes an upper end of the upper peripheral wall portion 21. A joining portion 23 extending radially outward is connected to a lower end portion of the upper peripheral wall portion 21. The lower shell 3 includes a lower peripheral wall portion 31 having a tubular shape and a bottom plate portion 32 that closes a lower end of the lower peripheral wall portion 31. A joining portion 33 extending radially outward is connected to an upper end portion of the lower peripheral wall portion 31. A first attachment hole 32a for attaching the first ignition device 4 to the bottom plate portion 32 and a second attachment hole 32b for attaching the second ignition device 7 to the bottom plate portion 32 are formed in the bottom plate portion 32.

The joining portion 23 of the upper shell 2 and the joining portion 33 of the lower shell 3 are overlapped and joined by laser welding or the like to form the housing 1 having a short cylindrical shape with both ends in the axial direction closed. The upper peripheral wall portion 21 of the upper shell 2 and the lower peripheral wall portion 31 of the lower shell 3 form the peripheral wall portion 11 that is tubular and connects the top plate portion 22 and the bottom plate portion 32. That is, the housing 1 includes the peripheral wall portion 11 that is tubular, the top plate portion 22 provided at one end of the peripheral wall portion 11, and the bottom plate portion 32 provided at the other end and facing the top plate portion 22. The peripheral wall portion 11, the top plate portion 22, the bottom plate portion 32, and the second inner tube member 8, which will be described below, define a first combustion chamber 10. The first ignition device 4, the first inner tube member 5, the transfer charge 6, the filter 9, and the first gas generating agent 110 are disposed in the first combustion chamber 10.
Ignition Device As illustrated in FIG. 1, the first ignition device 4 is fixed in the first attachment hole 32a formed in the bottom plate portion 32 of the lower shell 3. The first ignition device 4 includes the first igniter 41. The second ignition device 7 is fixed in the second attachment hole 32b formed in the bottom plate portion 32 of the lower shell 3. The second ignition device 7 includes the second igniter 71. Each of the first igniter 41 and the second igniter 71 accommodates an ignition charge therein and is activated by being supplied with an ignition current. Upon activation, the ignition charge is combusted and a combustion product is discharged to the outside. Each of the first igniter 41 and the second igniter 71 is an example of the "igniter" according to the present disclosure. The first ignition device 4 and the second ignition device 7 are activated independently of each other. In activating the second ignition device 7, the second ignition device 7 is activated simultaneously with the activation of the first ignition device 4 or at a predetermined timing after the activation of the first ignition device 4. Compared with a so-called single type gas generator, the gas generator 100 can discharge a large amount of combustion gas to the outside with various output profiles by the combustion of the first gas generating agent 110 combusted by activating the first ignition device 4 and the combustion of the second gas generating agent 120 combusted by activating the second ignition device 7. Note that the second ignition device 7 is not always activated. For example, depending on the strength of an impact sensed by a sensor, the gas generator 100 may activate only the first ignition device 4 without activating the second ignition device 7 when the impact is weak. Moreover, for example, when the impact is strong, the gas generator 100 can simultaneously activate the first ignition device 4 and the second ignition device 7.
Inner Tube Member The first inner tube member 5 is a bottomed tubular member extending from the bottom plate portion 32 toward the top plate portion 22 and includes a surrounding wall portion 51 having a tubular shape and a lid wall portion 52 that closes one end portion of the surrounding wall portion 51. The first ignition device 4 is fitted or press-fitted to the other end portion of the surrounding wall portion 51, and thus the first inner tube member 5 is attached to the bottom plate portion 32. As illustrated in FIG. 1, the first ignition device 4 is surrounded by the surrounding wall portion 51 to form a transfer charge chamber 53 between the first inner tube member 5 and the first ignition device 4. The transfer charge 6 that is combusted by the activation of the first ignition device 4 is accommodated in the transfer charge chamber 53. The surrounding wall portion 51 of the first inner tube member 5 is provided with a plurality of communication holes h1 that allow an internal space (that is, the transfer charge chamber 53) and an external space to communicate with each other. The communication holes h1 are closed by a seal tape in a state before the first ignition device 4 is activated.

The second inner tube member 8 is a bottomed tubular member extending from the bottom plate portion 32 toward the top plate portion 22 and includes a surrounding wall portion 81 having a tubular shape and a lid wall portion 82 that closes one end portion of the surrounding wall portion 81. The second ignition device 7 is fitted or press-fitted to the other end portion of the surrounding wall portion 81, and thus the second inner tube member 8 is attached to the bottom plate portion 32. As illustrated in FIG. 1, a second combustion chamber 20 in which the second ignition device 7 and the second gas generating agent 120 that is combusted by the activation of the second ignition device 7 are disposed is formed inside the second inner tube member 8. The surrounding wall portion 81 of the second inner tube member 8 is also provided with a plurality of communication holes h2 that allow an internal space (that is, the second combustion chamber 20) and the external space (that is, the first combustion chamber 10) to communicate with each other. The communication holes h2 are closed by a seal tape in a state before the second ignition device 7 is activated.

Filter

As illustrated in FIG. 1, the filter 9 is formed into a tubular shape and is disposed in the first combustion chamber 10 in a manner that the filter 9 surrounds the first gas generating agent 110 and the gas discharge ports 13 are positioned radially outside the filter 9. That is, the filter 9 is disposed between the first gas generating agent 110 and the plurality of gas discharge ports 13 and surrounds the first gas generating agent 110. Thus, as illustrated in FIG. 1, an annular space 12 is formed between an outer peripheral surface of the filter 9 and an inner surface 11a of the housing 1 (an inner peripheral surface of the peripheral wall portion 11). An upper end surface of the filter 9 is in contact with and supported by the top plate portion 22 of the upper shell 2, and a lower end surface is in contact with and supported by the bottom plate portion 32 of the lower shell 3. The filter 9 can be formed, for example, by forming a metal wire rod or a porous plate into a tubular shape. When the combustion gas of the first gas generating agent 110 and the second gas generating agent 120 passes through the filter 9, the filter 9 cools the combustion gas by removing heat of the combustion gas. In addition to the cooling function of the combustion gas, the filter 9 has a function of filtering the combustion gas by filtering a combustion residue contained in the combustion gas. Note that the "filter" according to the present disclosure may have at least any one of the functions of cooling the combustion gas or filtering the combustion residue.

Transfer Charge

In addition to a known black powder, a gas generating agent having good ignition properties and a higher combustion temperature than that of the first gas generating agent 110 can be used as the transfer charge 6. A combustion temperature of the transfer charge 6 can be set within a range from 1700 to 3000° C. As the transfer charge 6, a known transfer charge containing, for example, nitroguanidine (34 wt. %) and strontium nitrate (56 wt. %) can be used. In addition, the transfer charge 6 may have various shapes, such as a granular shape, a pellet shape, a columnar shape, or a disk shape.

Gas Generating Agent

The first gas generating agent 110 is combusted by the actuation of the first igniter 41 to generate the combustion gas. The second gas generating agent 120 is combusted by the actuation of the second igniter 71 to generate the combustion gas. As the first gas generating agent 110 and the second gas generating agent 120, a gas generating agent having a relatively low combustion temperature can be used. The combustion temperature of each of the first gas generating agent 110 and the second gas generating agent 120 can be set within the range from 1000 to 1700° C. As the first gas generating agent 110 and the second gas generating agent 120, a known gas generating agent containing, for example, guanidine nitrate (41 wt. %), basic copper nitrate (49 wt. %), a binder, and an additive can be used. The first gas generating agent 110 and the second gas generating agent 120 may also have a variety of shapes, such as a granular shape, a pellet shape, a columnar shape, or a disk shape.

Gas Discharge Port

As illustrated in FIG. 1, the peripheral wall portion 11 of the housing 1 is formed with the plurality of gas discharge ports 13 that penetrate through the housing 1 from the inside to the outside of the housing 1 and that are aligned in a circumferential direction. The gas discharge port 13 penetrates through the housing 1 from the inner surface 11a (the inner peripheral surface of the peripheral wall portion 11) to an outer surface 11b (the outer peripheral surface of the peripheral wall portion 11) of the housing 1. The internal space (first combustion chamber 10) of the housing 1 and the external space of the housing 1 communicate with each other through the gas discharge port 13. Thus, the gas discharge port 13 forms a flow path for discharging the combustion gas from the inside to the outside of the housing 1. Note that in the technique according to the present disclosure, the number of the gas discharge ports does not need to be plural, and one or more gas discharge ports may be formed in the housing.

Figure 2:
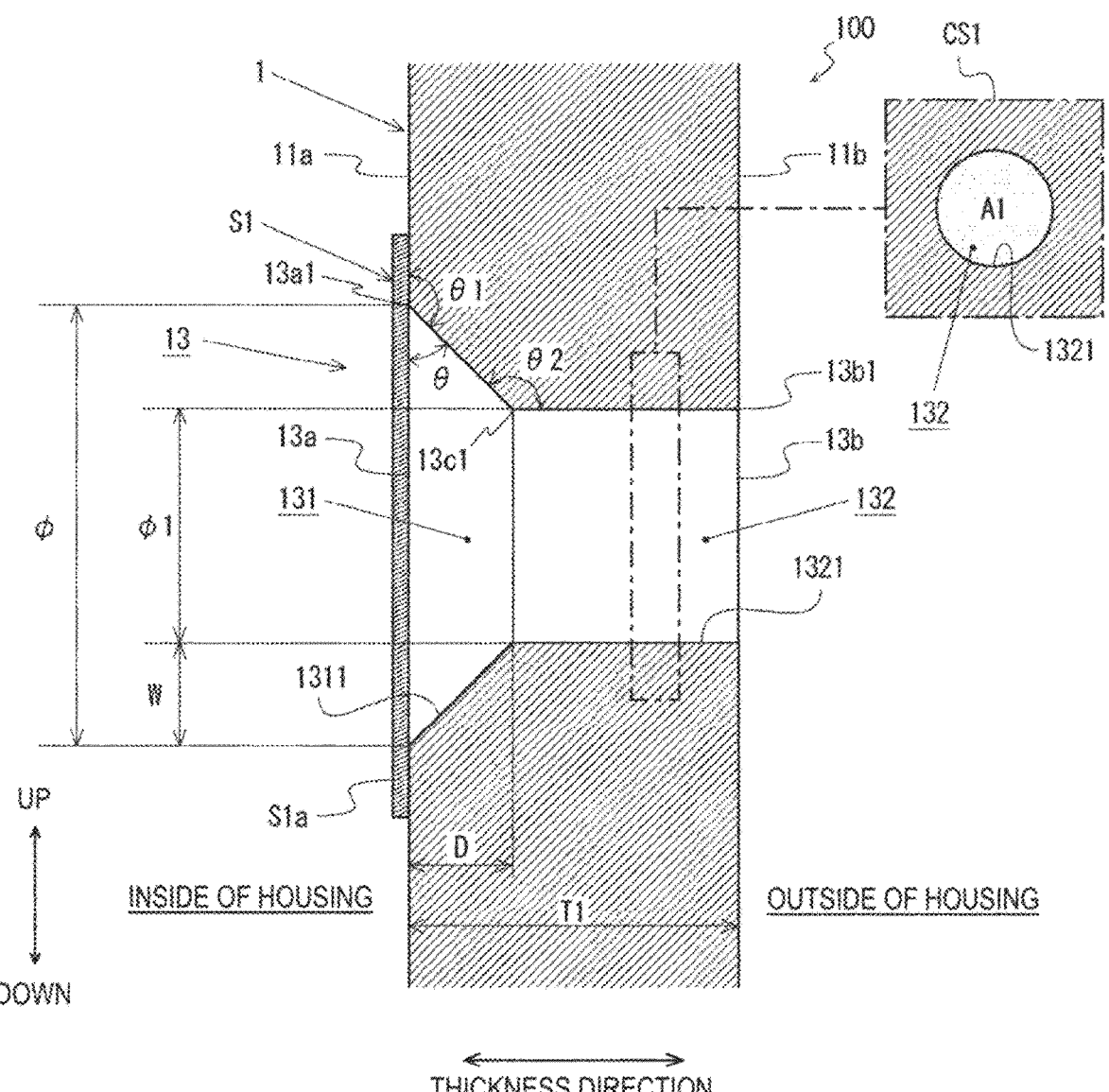
FIG. 2 is an enlarged cross-sectional view of the vicinity of a gas discharge port of the gas generator according to the embodiment.

FIG. 2 is an enlarged cross-sectional view of the vicinity of the gas discharge port 13 of the gas generator 100 according to the embodiment. FIG. 2 illustrates a cross section along the center axis CA1 of the housing 1. The cross section illustrated in FIG. 2 is also a cross section along the thickness direction of the housing 1. In FIG. 2, a reference sign 13a1 denotes an opening of the gas discharge port 13 on the inner surface 11a side of the housing 1, and a reference sign 13a2 denotes an opening of the gas discharge port 13 on the outer surface 11b side of the housing 1. The gas discharge port 13 according to the present embodiment is formed as a hole in which a cross section orthogonal to the thickness direction (gas flow direction) of the housing 1 and the opening are circular (perfect circular). However, each of the cross-sectional shape and the shape of the opening of the gas discharge port according to the present disclosure is not limited to a circular shape, and various shapes such as an elliptical shape, an oval shape, and a polygonal shape can be adopted. An opening 13a of the gas discharge port 13 is covered with the seal tape S1.

As illustrated in FIG. 2, the gas discharge port 13 includes a chamfered region 131 in which a corner portion of the opening on the inner surface 11a side of the housing 1 is removed over the entire circumference, and a straight region 132 being continuous with the chamfered region 131 and extending with a constant inner diameter along the thickness direction of the housing 1. In the gas discharge port 13, the chamfered region 131 opens on the inner surface 11*a* side of the housing 1, and the straight region 132 opens on the outer surface 11*b* side of the housing 1. The chamfered region 131 of the gas discharge port 13 opens to the inner surface 11*a* to form the opening 13*a*. The straight region 132 of the gas discharge port 13 opens to the outer surface 11*b* to form an opening 13*b*. The reference sign 13*a*1 indicates a peripheral edge of the opening 13*a*, and a reference sign 13*b*1 indicates a peripheral edge of the opening 13*b*. Further, a reference sign 13*c*1 indicates a boundary portion between an inner wall surface 1311 forming the chamfered region 131 and an inner wall surface 1321 forming the straight region 132.

The chamfered region 131 is formed in a tapered shape, and thus is reduced in diameter with increasing distance from the opening 13*a* on the inner surface 11*a* side of the housing 1 in the thickness direction of the housing. Therefore, a cross-sectional area of the chamfered region 131 decreases with increasing distance from the opening 13*a* on the inner surface 11*a* side of the housing 1 in the thickness direction of the housing. Therefore, the inner wall surface 1311 forming the chamfered region 131, of the inner wall surface of the gas discharge port 13, has a cylindrical shape whose diameter decreases with increasing distance from the opening 13*a* on the inner surface 11*a* side of the housing 1 in the thickness direction of the housing, and is formed in a linear shape inclined relative to the thickness direction in a cross section along the thickness direction of the housing 1. Thus, the inner wall surface 1311 faces the inner side of the housing 1.

The straight region 132 has a cross section being constant (in cross-sectional shape and cross-sectional area) in the thickness direction of the housing 1. Of the inner wall surface of the gas discharge port 13, the inner wall surface 1321 forming the straight region 132 has a cylindrical shape having a constant diameter in the thickness direction of the housing 1, and is formed in a linear shape extending along the thickness direction in a cross section along the thickness direction of the housing 1.

Although details will be described later, the gas discharge port 13 is formed by boring a through hole in the housing 1 by drilling or punching, and then removing a corner portion of an opening on the inner surface 11*a* side of the housing 1 by chamfering. The chamfered region 131 according to the present embodiment is formed in a tapered shape by so-called C chamfering, and a chamfering angle θ relative to the inner surface 11*a* of the housing 1 is 45 [°]. However, a value of the chamfering angle θ (the angle of θ in FIG. 2) is not limited thereto, and is only required to satisfy θ<90°. For example, a width dimension of the chamfered region 131 is defined as a chamfering width W [mm], and a depth dimension thereof is defined as a chamfering depth D [mm]. In this example, since the chamfered region 131 is formed by the C chamfering at the chamfering angle θ=45 [°], the chamfering width W and the chamfering depth D are equivalent to each other. The values of W and D in the C chamfering are set to a chamfering amount X (distance from a tip of a material to be chamfered: mm). Note that in the technique according to the present disclosure, it is not essential that the chamfering width and the chamfering depth be equivalent to each other, and the chamfering width and the chamfering depth may be different from each other.

Additionally, a diameter of the straight region 132 is defined as a hole diameter φ1 [mm], and a diameter of the opening 13*a* of the gas discharge port 13 on the inner surface

11*a* side of the housing 1 is defined as an opening diameter φ [mm]. In this case, the opening diameter φ is expressed by Equation (1) below.

$$\varphi = \varphi 1 + X \times 2 \qquad \text{Equation (1)}$$

Further, when the chamfering angle θ is 45°, a percentage of the chamfering amount X to the opening diameter φ of the gas discharge port 13 is defined as a chamfering percentage P [%]. The chamfering percentage P is expressed by Equation (2) below.

$$P = X/\varphi \times 100 \qquad \text{Equation (2)}$$

The chamfering percentage P is preferably set to 2.9 [%]≤P≤100 [%], more preferably set to 2.9 [%]≤P≤50 [%], much more preferably set to 2.9 [%]≤P≤30 [%], and still much more preferably set to 2.9 [%]≤P≤10 [%].

Here, a minor angle formed by the inner surface 11*a* of the housing 1 and the inner wall surface 1311 of the chamfered region 131 in the cross section along the thickness direction of the housing 1 is defined as an angle θ1. In this case, θ1>90 [°] (in this example, θ1=135 [°]) is satisfied. Similarly, a minor angle formed by the inner wall surface 1311 of the chamfered region 131 and the inner wall surface 1321 of the straight region 132 in the cross section along the thickness direction of the housing 1 is defined as an angle θ2. In this case, θ2>90 [°] (in this example, θ2=135 [°]) is satisfied. That is, each of θ1 and θ2 is an obtuse angle.

Here, as illustrated in FIG. 2, the area of the cross section of the gas discharge port 13 orthogonal to the thickness direction of the housing 1 is minimized in the straight region 132. The minimum cross-sectional area of the gas discharge port 13 in the cross section orthogonal to the thickness direction of the housing 1 is defined as A1. A cross-sectional view CS1 in FIG. 2 indicates a cross section of the straight region 132 orthogonal to the thickness direction of the housing 1. As illustrated in the cross-sectional view CS1, the gas discharge port 13 according to the present embodiment has the minimum cross-sectional area A1 in the straight region 132.

Seal Tape

As illustrated in FIG. 1, the inner surface 11*a* of the housing 1 is attached with the seal tape S1. The seal tape S1 is an example of the "seal" according to the present disclosure. The seal tape S1 is a metal member formed in a sheet shape (a band shape in the present example), closes the gas discharge port 13 before activation of the igniter, and is ruptured at the time of the activation of the igniter to open the gas discharge port 13. Since the seal tape S1 is made of a metal, the seal tape S1 has a certain degree of flexibility and ductility at least against the pressure of the combustion gas.

Figure 3:
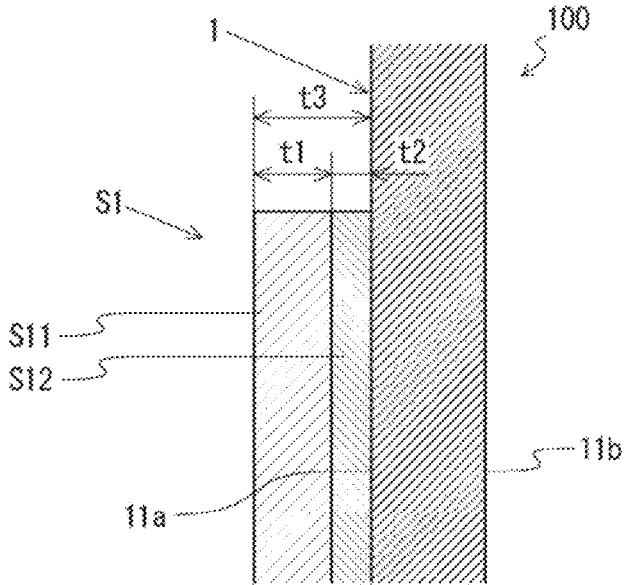
FIG. 3 is a cross-sectional view for describing a structure of a seal tape in the gas generator according to the embodiment.

FIG. 3 is a cross-sectional view for describing a structure of the seal tape S1 of the gas generator 100 according to the embodiment. FIG. 3 illustrates a state in which the seal tape S1 is attached to the inner surface 11*a* of the housing 1. The seal tape S1 is, for example, a band-shaped member in which an adhesive agent layer is formed on one surface of a substrate layer made of a metal. As illustrated in FIG. 3, the seal tape S1 includes a substrate layer S11 made of aluminum and a bonding layer S12 provided on one surface of the substrate layer S11, and the bonding layer S12 adheres to the inner surface 11a of the housing 1 so that the seal tape S1 is attached to the inner surface 11a. Note that the substrate layer S11 is preferably made of aluminum, but is not limited thereto. The substrate layer S11 is made of stainless steel or copper. As the bonding layer S12, a layer made of a known synthetic resin-based adhesive agent can be employed. The adhesive agent is preferably a silicone-based, rubber-based or epoxy-based adhesive agent or the like from the viewpoint of heat resistance and adhesion. However, the material of the seal tape S1 is not limited to the above. Here, as illustrated in FIG. 3, thicknesses of the substrate layer S11, the bonding layer, and the seal tape S1 are denoted by using t1, t2, and t3, respectively.

As illustrated in FIG. 2, the seal tape S1 is attached to the inner surface 11a while covering the openings of the gas discharge ports 13 on the inner surface 11a side of the housing 1, thereby closing the plurality of gas discharge ports 13. Therefore, the chamfered regions 131 of all the gas discharge ports 13 are covered with the seal tape S1. Before the activation of the igniter (first igniter 41), the gas discharge port 13 is closed by the seal tape S1 to prevent outside air (moisture) from entering inside the housing 1 through the gas discharge port 13, and the inside of the housing 1 is kept airtight. Then, when the first igniter 41 is activated, the seal tape S1 is pressurized by the generated gas to be ruptured, thereby opening the plurality of gas discharge ports 13.

Here, in the present specification, a pressure required for opening each gas discharge port by rupturing the seal (the seal tape S1 in the present example) at the gas discharge port is defined as a "rupturing pressure". When the seal is ruptured, the seal having received the pressure of the combustion gas is pressed against the peripheral edge of the opening of the gas discharge port on the inner surface side of the housing. Therefore, the rupturing pressure of the seal in each gas discharge port is determined according to specifications of the seal and the shape of the opening of the gas discharge port. The specifications of the seal are specifically a tensile strength and a thickness of the seal. The lower the tensile strength of the seal is or the thinner the thickness of the seal is, the lower the rupturing pressure is.

In addition, in the present specification, an area of a cross section orthogonal to the flow direction of the combustion gas, of the flow path for the combustion gas (gas flow path), is defined as a flow path cross-sectional area. The flow path is formed in the gas discharge port 13 by the seal tape S1 being ruptured. In the present embodiment, a direction in which the gas discharge port 13 penetrates through the housing 1, that is, the thickness direction of the housing 1 is the flow direction of the combustion gas. Then, the minimum cross-sectional area of the gas flow path is defined as a minimum flow path cross-sectional area. In the gas flow path, a portion having the minimum flow path cross-sectional area is a rate-regulating portion (throttle) of gas discharge. An effective cross-sectional area through which the gas can actually flow in the gas flow path has a size corresponding to the minimum flow path cross-sectional area. That is, a gas discharge amount per unit time of the gas discharge port 13 is determined according to the minimum flow path cross-sectional area of the gas flow path formed in the gas discharge port 13. Then, an internal pressure of the housing 1 can be controlled by adjusting the number of gas discharge ports to be opened and an amount of gas to be discharged from the gas discharge ports per unit time.

Operation

A basic operation of the gas generator 100 according to the present embodiment will be described below with reference to FIG. 1. In this example, a case in which the second ignition device 7 is activated following the first ignition device 4 (that is, after the first ignition device 4 is activated) will be described.

When a sensor (not illustrated) senses an impact, an ignition current is supplied to the first igniter 41 of the first ignition device 4 and the first igniter 41 is activated. Then, the ignition charge accommodated in the first igniter 41 is combusted, and a flame, a high-temperature gas, and the like, which are combustion products of the ignition charge, are discharged to the inside of the transfer charge chamber 53. Thus, the transfer charge 6 accommodated in the transfer charge chamber 53 is combusted, and a combustion gas is generated in the transfer charge chamber 53. When the seal tape closing the communication holes h1 of the surrounding wall portion 51 of the first inner tube member 5 is ruptured due to the pressure of the combustion gas of the transfer charge 6, the combustion gas is discharged to the outside of the transfer charge chamber 53 through the communication holes h1. Then, the combustion gas of the transfer charge 6 comes into contact with the first gas generating agent 110 disposed around the surrounding wall portion 51, and the first gas generating agent 110 is ignited. When the first gas generating agent 110 is combusted, a high-temperature and high-pressure combustion gas is generated in the first combustion chamber 10. The seal tape S1 is ruptured by the pressure of the combustion gas to open the plurality of gas discharge ports 13. When this combustion gas passes through the filter 9, the combustion gas is cooled, and a combustion residue is filtered. The combustion gas of the first gas generating agent 110 cooled and filtered by the filter 9 is introduced into the annular space 12, and is discharged through the plurality of gas discharge ports 13 to the outside of the housing 1.

Subsequently, when the second igniter 71 of the second ignition device 7 is activated, the second gas generating agent 120 accommodated in the second combustion chamber 20 is combusted, and a combustion gas is generated in the second combustion chamber 20. When the seal tape closing the communication holes h2 of the surrounding wall portion 81 of the second inner tube member 8 is ruptured by the pressure of the combustion gas of the second gas generating agent 120, the combustion gas is discharged to the first combustion chamber 10 through the communication holes h2. After being cooled and filtered by the filter 9, the combustion gas of the second gas generating agent 120 is introduced into the annular space 12 and is discharged through the plurality of gas discharge ports 13 to the outside of the housing 1.

The combustion gases of the first gas generating agent 110 and the second gas generating agent 120 flow into an airbag (not illustrated) after being discharged to the outside of the housing 1. This causes the airbag to inflate, forming a cushion between an occupant and a rigid structure and protecting the occupant from an impact.

Gas Discharge Method for Gas Generator

Figure 4:
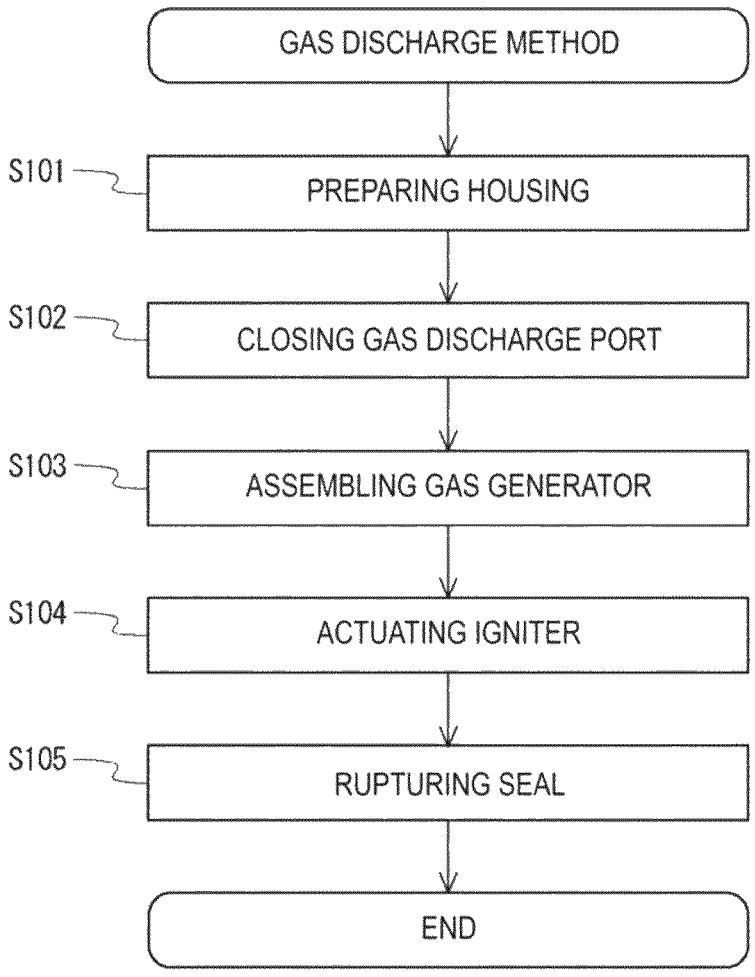
FIG. 4 is a flowchart of a gas discharge method for a gas generator according to an embodiment.

Next, a method for discharging a gas (gas discharge method) in a gas generator according to the present embodiment will be described. Note that the gas discharge method for the gas generator according to the present disclosure is not limited to the following method. FIG. 4 is a flowchart of the gas discharge method for the gas generator according to the embodiment. As illustrated in FIG. 4, the gas discharge method for the gas generator according to the present embodiment includes a step S101 of preparing a housing, a step S102 of closing gas discharge ports, a step S103 of assembling a gas generator, a step S104 of actuating an igniter, and a step S105 of rupturing a seal.

Figure 5:
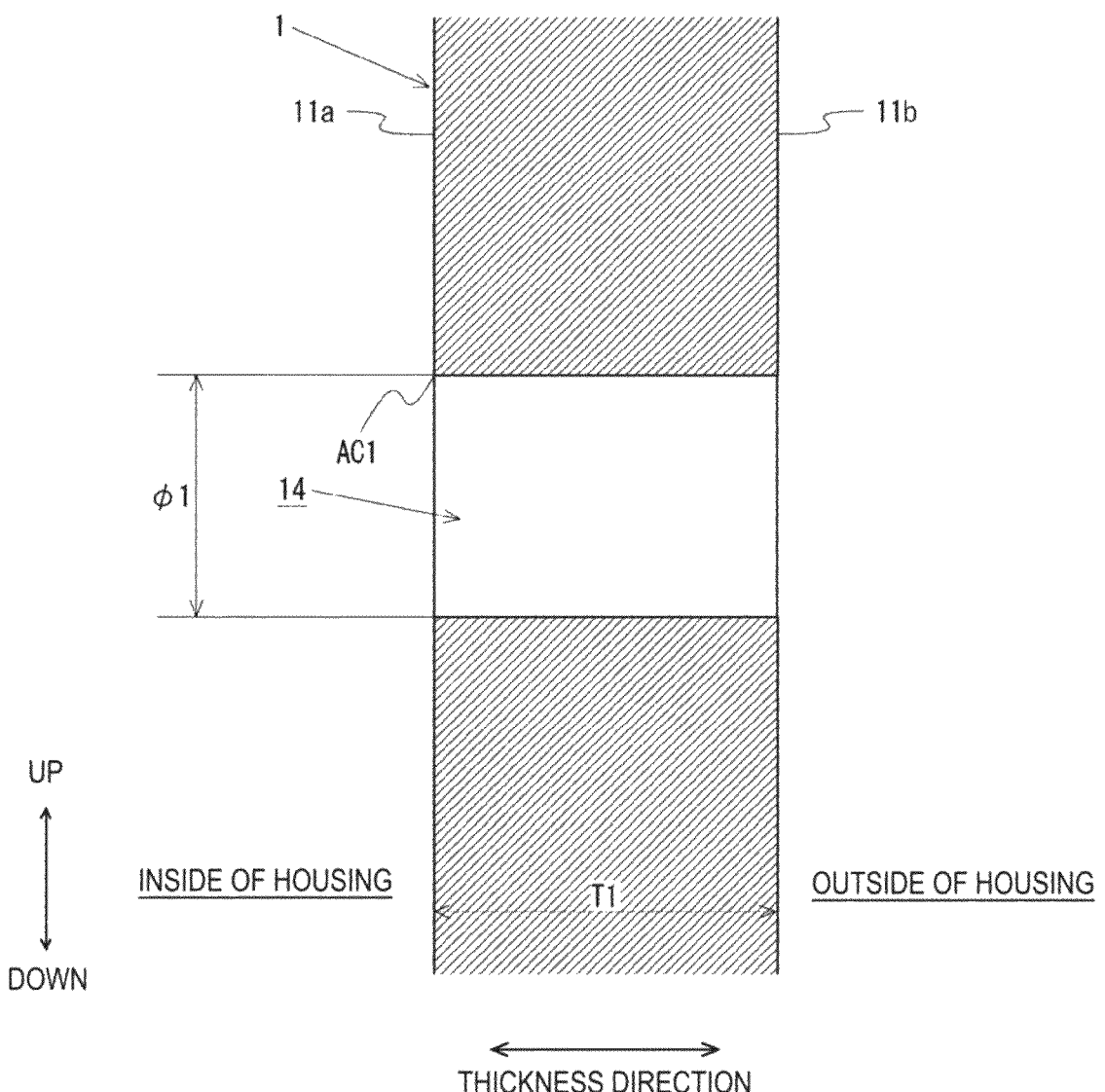
FIG. 5 is a cross-sectional view (1) for describing a process of preparing a housing according to the embodiment.
Figure 6:
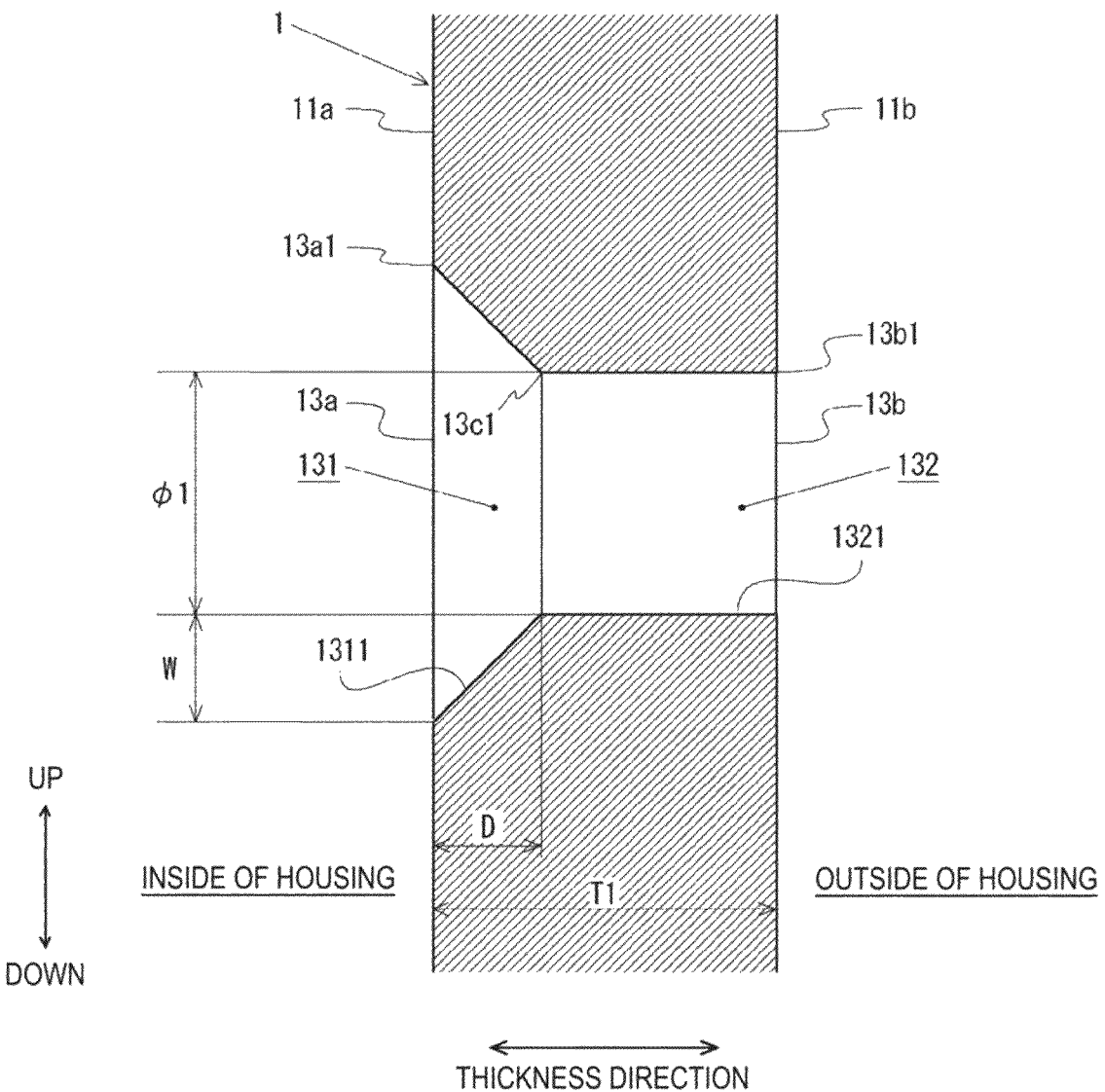
FIG. 6 is a cross-sectional view (2) for describing the process of preparing the housing according to the embodiment.

First, in the step S101 of preparing the housing, the housing 1 in which the gas discharge ports 13 are formed is prepared. FIG. 5 and FIG. 6 are cross-sectional views for describing the preparing of the housing according to the embodiment. In FIG. 5 and FIG. 6, a cross section along the thickness direction of the housing 1 is illustrated. In the preparing of the housing, the gas discharge ports 13 are formed in the housing 1.

In forming the gas discharge port 13, first, as illustrated in FIG. 5, a through hole 14 extending with a constant inner diameter along the thickness direction of the housing 1 is formed in the housing 1. The through hole 14 is bored in the housing 1 at a position where the gas discharge port 13 is to be formed, for example, by drilling or punching. Here, a reference sign AC1 in FIG. 5 indicates a corner portion of an opening of the through hole 14 on the inner surface 11a side of the housing 1. Next, as illustrated in FIG. 6, the chamfered region 131 and the straight region 132 are formed by removing the corner portion AC1 over the entire circumference by C chamfering. In the through hole 14, a region removed by the chamfering forms the chamfered region 131, and a region remaining without being removed forms the straight region 132. The chamfered region 131 is formed such that the diameter thereof is reduced with increasing distance from the opening 13a on the inner surface 11a side of the housing 1 in the thickness direction of the housing. The inner wall surface 1311 of the chamfered region 131 is formed into a linear shape inclined relative to the thickness direction in a cross section along the thickness direction of the housing 1. The straight region 132 is formed to open to the outer surface of the housing with the boundary portion 13c1 serving as a starting point and extend with a constant inner diameter. The inner wall surface 1321 of the straight region 132 is formed into a linear shape extending along the thickness direction in a cross section along the thickness direction of the housing 1. In this way, the gas discharge port 13 including the chamfered region 131 and the straight region 132 is formed in the housing 1.

Next, in the step S102 of closing the gas discharge ports, the seal tape S1 is attached to the inner surface 11a of the housing 1 and thus covers the openings 13a of the plurality of gas discharge ports 13 on the inner surface 11a side of the housing 1. Thus, all of the plurality of gas discharge ports 13 are closed.

Next, in the step S103 of assembling the gas generator, the first ignition device 4 and the second ignition device 7 are attached to the lower shell 3, the first inner tube member 5 filled with the transfer charge 6 is fixed to the first ignition device 4, and the second inner tube member 8 filled with the second gas generating agent 120 is fixed to the second ignition device 7. Thereafter, the filter 9 is disposed at the lower shell 3, and the inside of the filter 9 is filled with the first gas generating agent 110. Finally, the upper shell 2 is put over the lower shell 3, and then, the joining portion 23 of the upper shell 2 and the joining portion 33 of the lower shell 3 are overlapped and joined by laser welding or the like to form the housing 1. As described above, the gas generator 100 is assembled.

Next, in the step S104 of activating the igniter, the igniter of the gas generator 100 is activated. When the gas generator 100 activates the second igniter 71 after activation of the first igniter 41, the process proceeds to the next step (step S105) after the activation of the first igniter 41 and before activation of the second igniter 71.

Figure 7:
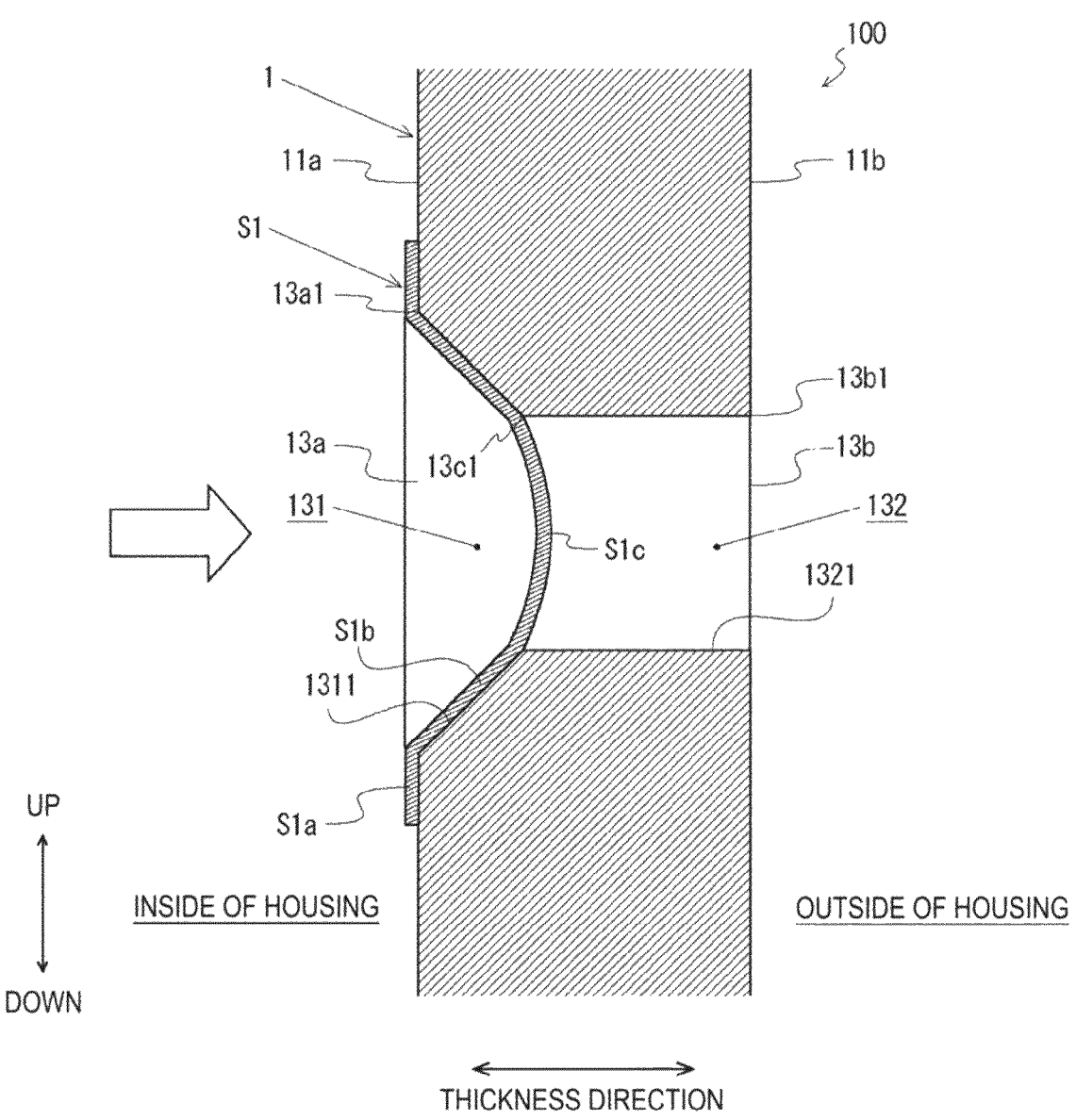
FIG. 7 is a cross-sectional view (1) for describing a process of rupturing a seal according to the embodiment.
Figure 8:
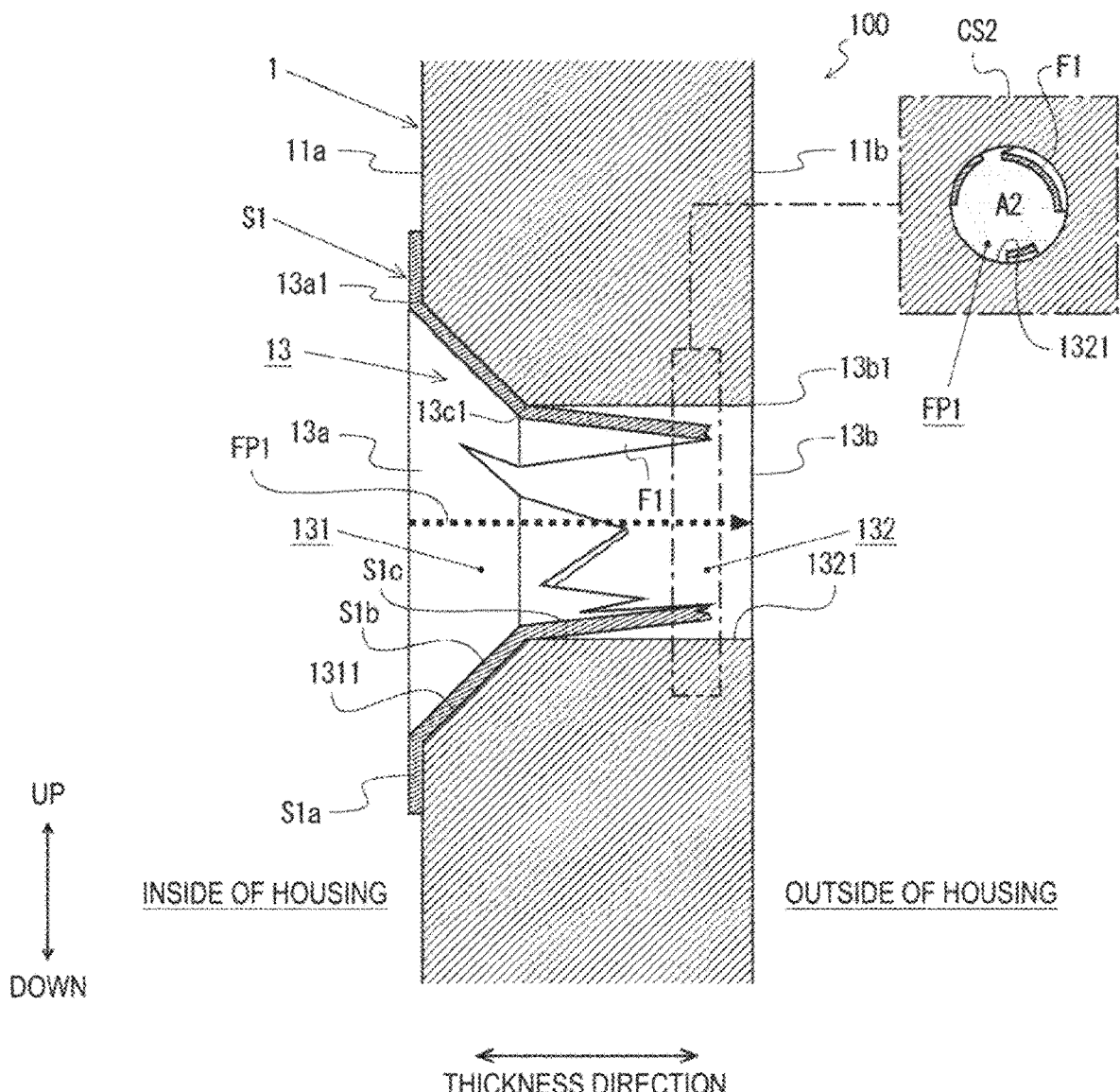
FIG. 8 is a cross-sectional view (2) for describing the process of rupturing the seal according to the embodiment.

Next, in the step S105 of rupturing the seal, the seal tape S1 is ruptured by the pressure of the combustion gas generated by the activation of the igniter. FIG. 7 and FIG. 8 are cross-sectional views for describing the rupturing of the seal according to the embodiment. In FIG. 7 and FIG. 8, a cross section along the thickness direction of the housing 1 is illustrated.

As described above, before the activation of the igniter, the seal tape S1 covers the chamfered region 131, and the inner wall surface 1311 of the chamfered region 131 faces the inner side of the housing 1. Therefore, when the igniter is actuated, as illustrated in FIG. 7, the seal tape S1 is deformed by being extended toward the outer side of the housing 1 due to the pressure of the combustion gas, and is pressed against the inner wall surface 1311 of the chamfered region 131. At this time, the seal tape S1 is bent at an opening edge 13a1 and extends along the inner wall surface 1311 of the chamfered region 131. Here, in the seal tape S1, a region attached to the inner surface 11a of the housing 1 is referred to as an attachment region Sla, an annular region being in contact with the inner wall surface 1311 of the chamfered region 131 is referred to as a contact region S1b, and a region positioned on an inner side relative to the contact region S1b is referred to as an inner region S1c.

Additionally, as illustrated in FIG. 7, the inner region S1c reaches the straight region 132 of the gas discharge port 13 when the seal tape S1 is stretched and deformed by the pressure of the combustion gas.

In this state, the pressure of the combustion gas further acts on the inner region S1c, and a tensile load in the inner region S1c exceeds a tensile strength of the seal tape S1, resulting in rupture of the inner region S1c by ductile fracture (fracture) as illustrated in FIG. 8. That is, the seal tape S1 bursts by film fracture from a central portion of the inner region S1c. The combustion gas is discharged through the gas discharge ports 13. In addition, the inner region S1c is ruptured in the gas discharge port 13 in a state where at least a part of the attachment region Sla of the seal tape S1 remains on the inner surface 11a of the housing 1, and thus a ruptured piece F1 of the seal tape S1 is formed in the gas discharge port 13. The ruptured piece F1 is constituted by a part of the ruptured inner region S1c, but may include a part of the contact region S1b. The ruptured piece F1 is connected to the attachment region Sla and can be bent by the pressure of the combustion gas with the attachment region Sla serving as a base end. Therefore, the discharge of the combustion gas is not affected by the ruptured piece F1.

If the chamfered region 131 is not formed in the gas discharge port 13 and the corner portion AC1 (see FIG. 5) of the opening on the inner surface 11a side of the housing 1 is not removed, the seal tape S1 is pressed against the corner portion AC1 by the pressure of the combustion gas, which causes a shearing force to act on the seal tape S1. As a result, the seal tape S1 is integrally punched out and ruptured along the opening edge of the gas discharge port 13 by shear fracture. This makes it difficult for the seal tape S1 to remain in the gas discharge port 13. Further, fragments of the punched seal tape S1 may be discharged to the outside of the housing 1 (the outside of the gas generator 100) due to the pressure of the combustion gas.

On the other hand, in the present embodiment, the chamfered region 131 is formed in the gas discharge port 13, the seal tape S1 is received by the inner wall surface 1311 of the chamfered region 131, and thus the ruptured piece F1 that is a part of the seal tape S1 remains in the gas discharge port 13 after the rupture of the seal tape S1. Therefore, when the combustion gas passes through the gas discharge port 13, at least one or some combustion residues contained in the combustion gas collide with the ruptured piece F1, which suppresses discharge of the combustion residues to the outside of the gas generator 100 through the gas discharge port 13. As a result, a discharge amount of the combustion residues is reduced. In addition, at least a part of the seal tape S1 remains in the gas discharge port 13 as the ruptured piece F1, resulting in reduction in an amount of fragments of the seal tape S1 discharged by the pressure of the combustion gas to the outside of the gas generator 100.

Here, a minimum flow path cross-sectional area of a gas flow path FP1 formed in the gas discharge port 13 by rupturing the seal tape S1 is denoted as A2. A cross-sectional view CS2 in FIG. 8 illustrates a cross section of the straight region 132 orthogonal to the thickness direction of the housing 1. As illustrated in the cross-sectional view CS2, the gas flow path FP1 has the minimum flow path cross-sectional area A2 in the straight region 132.

If the ruptured seal tape S1 does not reach the straight region 132, the minimum flow path cross-sectional area A2 is equivalent to the minimum cross-sectional area A1 of the gas discharge port 13. However, in the present embodiment, since the seal tape S1 reaches the straight region 132, the gas flow path FP1 is narrowed in the straight region 132. Therefore, the minimum flow path cross-sectional area A2 (effective cross-sectional area) of the gas flow path FP1 is smaller than the minimum cross-sectional area A1 of the gas discharge port 13. That is, A2<A1 is satisfied. Thus, the effective cross-sectional area of the gas flow path FP1 through which the gas can actually flow is smaller than that in the case where the seal tape S1 does not reach the straight region 132. This also reduces the discharge amount of combustion residues.

Additionally, in the present embodiment, the combustion gas generated by the activation of the igniter and passed through the filter 9 is introduced into the annular space 12, which allows the pressure of the combustion gas to be uniform in the annular space 12. Uniformizing the pressure in the annular space allows the pressure to act uniformly on the seal tape S1 in the plurality of gas discharge ports 13. Thus, the seal tape S1 can be uniformly ruptured at the plurality of gas discharge ports 13. Note that in the gas generator 100 according to the present embodiment, each of the plurality of gas discharge ports 13 is provided with the chamfered region 131, and the ruptured piece F1 is generated. However, it is not necessary that a part of the seal tape S1 remains in each of all the gas discharge ports 13 after the igniter is activated.

Actions and Effects

As described above, the gas generator 100 according to the present embodiment includes the gas discharge port 13 penetrating through the housing 1 from the inside to the outside of the housing 1 accommodating the igniter and the gas generating agent therein, and the seal tape S1 made of a metal and formed in a sheet shape. The seal tape S1 is attached to the inner surface of the housing 1, covers the opening 13a of the gas discharge port 13 on the inner surface 11a side of the housing 1 before the actuation of the igniter to close the gas discharge port 13, and is ruptured by the pressure of the combustion gas generated by the actuation of the igniter to open the gas discharge port 13. The gas discharge port 13 includes the chamfered region 131 in which the corner portion of the opening 13a on the inner surface 11a side of the housing 1 is removed over the entire circumference. According to this configuration, when the igniter is activated, the seal tape S1 pressurized by the combustion gas is received by the inner wall surface 1311 of the chamfered region 131, which suppresses the shear fracture of the seal tape S1 and easily fractures the seal tape S1 by pulling. This enables the ruptured piece F1 that is at least a part of the seal tape S1 to remain in the gas discharge port 13 after the rupture of the seal tape S1. Thus, the ruptured piece F1 prevents a combustion residue contained in the combustion gas from passing through the gas discharge port 13 and being discharged to the outside of the gas generator 100. As a result, the amount of the combustion residues to be discharged from the gas generator 100 can be reduced.

In addition, in the gas generator 100 according to the present embodiment, the minimum flow path cross-sectional area A2 of the gas flow path FP1 formed in the gas discharge port 13 by rupturing the seal tape S1 is smaller than the minimum cross-sectional area A1 of the gas discharge port 13. As a result, the effective cross-sectional area of the gas flow path FP1 can be reduced, and the discharge amount of the combustion residues can be further reduced. Note that in the present embodiment, the effective cross-sectional area of the gas flow path FP1 is reduced by a part of the seal tape S1 that reaches the straight region 132, but an aspect of reducing the effective cross-sectional area is not limited to this. In addition, in the technique according to the present disclosure, it is not essential that the gas discharge port include the straight region. For example, the gas discharge port may be an hourglass-shaped hole including, as a region connected to the chamfered region, a tapered region whose diameter increases with increasing distance from the chamfered region toward the outside of the housing in the thickness direction of the housing.

Here, in the above-described seal tape S1 including the substrate layer S11 made of aluminum and the bonding layer S12 provided on one surface of the substrate layer S11 and bonded to the inner surface of the housing 1, the substrate layer S11 preferably has a thickness t1 equal to or more than 50 [μm] and equal to or less than 200 [μm]. This can suppress the shear fracture of the seal tape S1 pressurized by the combustion gas after the activation of the igniter, and easily fracture the seal tape S1 by pulling. From the viewpoint of suppressing the shear fracture, the seal tape S1 more preferably has a tensile strength equal to or more than 100 [N]/20 [mm] and equal to or less than 200 [N]/20 [mm] as measured in accordance with JIS Z0237. However, the thickness of the substrate layer of the seal according to the present disclosure and the tensile strength of the seal are not limited to the above.

Modified Examples of Embodiment

Gas generators according to modified examples of the embodiment will be described below. In the description of the modified examples, differences from the aspects described in FIG. 1 to FIG. 8 will be mainly described, and detailed descriptions about similar points will be omitted.

First Modified Example

Figure 9:
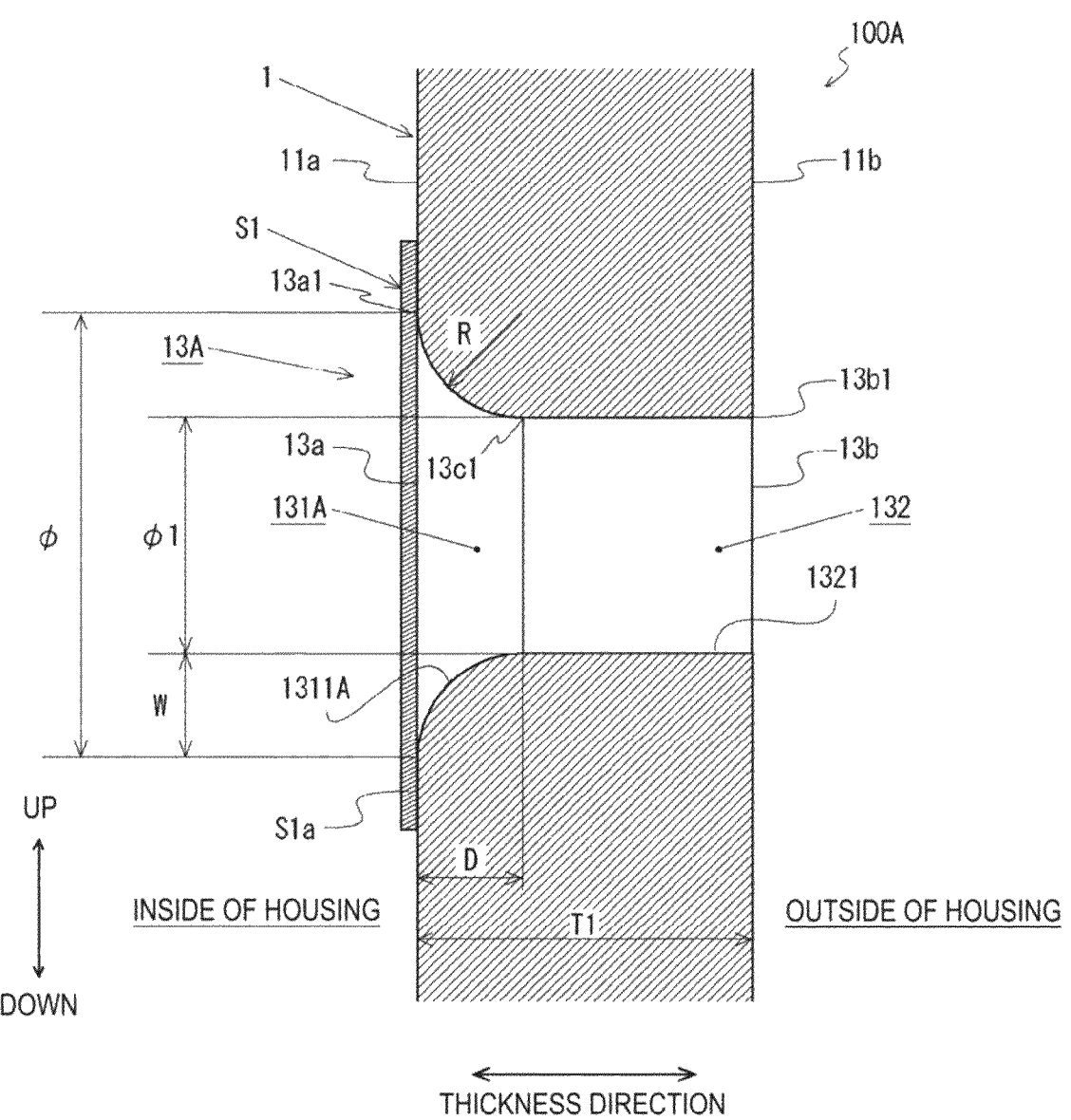
FIG. 9 is an enlarged cross-sectional view of the vicinity of a gas discharge port in a gas generator according to a first modified example of the embodiment.

FIG. 9 is an enlarged cross-sectional view of the vicinity of a gas discharge port 13A of a gas generator 100A according to a first modified example. FIG. 9 corresponds to FIG. 2, and illustrates a cross section along the thickness direction of the housing 1.

The gas discharge port 13A according to the first modified example is formed as a hole in which a cross section orthogonal to the thickness direction of the housing 1 and the opening are circular (perfect circular). As illustrated in FIG. 9, the gas discharge port 13A includes a chamfered region 131A formed by removing (rounding) a corner portion of the opening on the inner surface 11a side of the housing 1 over the entire circumference, and the straight region 132 connected to the chamfered region 131A and extending with a constant inner diameter along the thickness direction of the housing 1.

The chamfered region 131A according to the first modified example is formed such that the diameter thereof is reduced with increasing distance from the opening 13a on the inner surface 11a side of the housing 1 in the thickness direction of the housing. Therefore, an inner wall surface 1311A forming the chamfered region 131A has a cylindrical shape whose diameter decreases with increasing distance from the opening 13a on the inner surface 11a side of the housing 1 in the thickness direction of the housing, and is formed in an arc shape curved in a protruding manner toward the inside of the housing 1 in a cross section along the thickness direction of the housing 1. Thus, the inner wall surface 1311A faces the inside of the housing 1.

The gas discharge port 13A is formed by boring a through hole in the housing 1 by drilling or punching, and rounding the corner portion of the opening on the inner surface 11a side of the housing 1 by so-called R chamfering, in the step S101 (of preparing the housing) of the above-described gas discharge method. The inner wall surface 1311A of the chamfered region 131 is formed in a curved shape (in this example, an arc shape) in a cross section along the thickness direction of the housing 1 by R surface processing. Assuming that a curvature radius of the R chamfering is defined as R [mm], W=D=R is satisfied. Note that the inner wall surface 1311A of the chamfered region 131A may have a curved shape other than an arc in a cross section taken along the thickness direction of the housing 1, and the chamfering width W and the chamfering depth D do not need to be equivalent to each other.

Also, in the gas generator 100A according to the first modified example, actions and effects similar to those of the above-described gas generator 100 are achieved. That is, the ruptured piece F1 that is at least a part of the seal tape S1 can remain in the gas discharge port 13A after the seal tape S1 is ruptured. As a result, the amount of the combustion residues to be discharged from the gas generator 100A can be reduced. In addition, also in the gas generator 100A, a minimum flow path cross-sectional area of a gas flow path formed in the gas discharge port 13A by rupturing the seal tape S1 is smaller than a minimum cross-sectional area of the gas discharge port 13A. As a result, the effective cross-sectional area of the gas flow path can be reduced and the discharge amount of the combustion residues can be further reduced.

Second Modified Example

Figure 10:
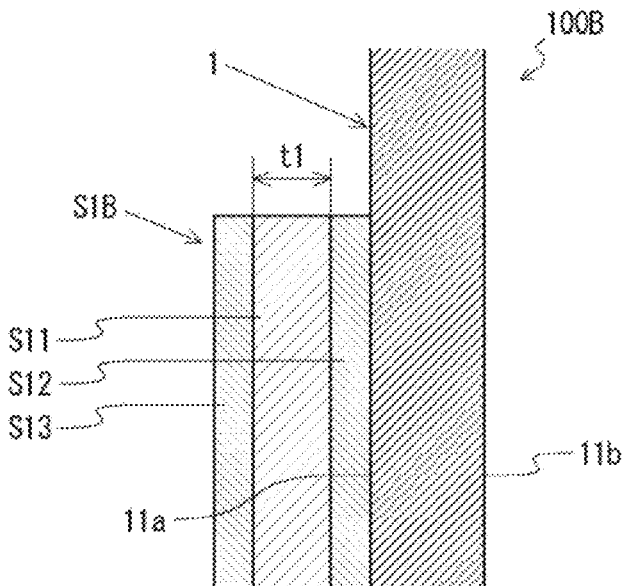
FIG. 10 is a cross-sectional view for describing a structure of a seal tape in a gas generator according to a second modified example of the embodiment.

FIG. 10 is a cross-sectional view for describing a structure of a seal tape S1B of a gas generator 100B according to a second modified example. FIG. 10 illustrates a state in which the seal tape S1B is attached to the inner surface 11a of the housing 1. As illustrated in FIG. 10, the seal tape S1B includes the substrate layer S11 made of aluminum, the bonding layer S12 provided on one surface of the substrate layer S11 and bonded to the inner surface 11a of the housing 1, and an adhesive layer S13 provided on the other surface of the substrate layer S11 and having adhesion. As illustrated in FIG. 10, the adhesive layer S13 faces the inside of the housing 1. As the adhesive layer S13, a layer made of a known synthetic resin-based adhesive agent can be employed, similarly to the bonding layer S12.

Also, in the gas generator 100B according to the second modified example, actions and effects similar to those of the above-described gas generator 100 are achieved. Furthermore, in the gas generator 100B according to the second modified example, since the adhesive layer S13 is provided in the seal tape S1B and faces the inside of the housing 1, after the seal tape S1B is ruptured, combustion residues can be attached to and filtered by the adhesive layer S13 of a part (the ruptured piece F1) of the seal tape S1B remaining in the gas discharge port 13. As a result, the discharge amount of the combustion residues can be further reduced.

Combustion Residue Amount Measurement Test

A test (combustion residue amount measurement test) for measuring the discharge amount of the combustion residues of the gas generator according to Example of the present disclosure was performed. Hereinafter, the present disclosure will be specifically described with reference to Example. However, the present disclosure is not limited to the following Example.

In the test, each of gas generators according to Example and Comparative Example, which will be described below, was actuated, and a discharge amount of combustion residues discharged from gas discharge ports to the outside of a housing was measured. Example corresponds to the gas generator 100 according to the embodiment described with reference to FIG. 1 to FIG. 4 and FIG. 6 to FIG. 8. Comparative Example is different from Example in that the gas discharge port does not include a chamfered region. That is, the entire region of the gas discharge port in Comparative Example corresponds to a straight region. In each of Example and Comparative Example, two types of gas discharge ports having different hole diameters φ1 in the straight region were provided in the housing. Of the two types of gas discharge ports, the gas discharge port having a larger hole diameter φ1 is referred to as a "large hole", and the gas discharge port having a smaller hole diameter φ1 is referred to as a "small hole". The gas discharge ports of Example were formed by chamfering through holes bored by drilling, and the gas discharge ports of Comparative Example were formed by punching (punching with a press machine) and were not chamfered. A transfer charge and a gas generating agent having the same specifications were used in equivalent amounts in Example and Comparative Example. The seal tape used had a substrate layer having a thickness t1 of 100 [μm], a bonding layer having a thickness t2 of 50 [μm], and a tensile strength of 119 [N]/20 [mm] measured in accordance with JIS Z0237.

For each of Example and Comparative Example, the discharge amounts of the combustion residues were measured when the first igniter and the second igniter were actuated at the same time and when the second igniter was actuated 100 [msec] after the first igniter was actuated. In addition, three samples of each of Example and Comparative Example were prepared, the discharge amounts of the combustion residues were measured, and an average value of the discharge amounts of the combustion residues was calculated in each of Example and Comparative Example.

FIG. 11 is a table showing the results of the combustion residue amount measurement test. In the table of FIG. 11, a numerical value denoted in the column of "φ1 [mm]" of "large hole" indicates a hole diameter φ1 [mm] of the straight region of the large hole. A numerical value denoted in the column of "number [pieces]" of "large hole" indicates the number of large holes. Similarly, a numerical value denoted in the column of "φ1 [mm]" of "small hole"

indicates a hole diameter φ1 [mm] of the straight region of the small hole. A numerical value denoted in the column of "number [pieces]" of "small hole" indicates the number of small holes.

In the table of FIG. 11, a numerical value denoted in the column of "simultaneous ignition" of "combustion residue amount [mg]" is an average value [mg] of the discharge amounts of the combustion residues when the first igniter and the second igniter are simultaneously actuated, and a numerical value denoted in the column of "delayed ignition" is an average value [mg] of the discharge amounts of the combustion residues when the second igniter is actuated with a delay of 100 [msec] after actuation of the first igniter.

As shown in FIG. 11, in both cases of the simultaneous ignition and the delayed ignition, the discharge amount of the combustion residues was smaller in Example than in Comparative Example. From the above test results, it was confirmed that Example of the present disclosure can reduce the discharge amount of the combustion residues.

Chamfering Percentage Evaluation Test

A test (chamfering percentage evaluation test) was performed to evaluate a relationship between a chamfering percentage P [%], which is a percentage of the chamfering amount X to the opening diameter φ of the gas discharge port on the inner surface side of the housing, and a ruptured state of the seal tape.

FIG. 12 is a table showing the results of the chamfering percentage evaluation test. In the test, the gas discharge ports of No. 1 to No. 14 shown in FIG. 12 were formed in a housing having a depth T1 of 1.4 mm, and were closed with a seal tape having a thickness t3 of 100 μm from the inner surface side of the housing. Then, a pressure of the combustion gas was applied to the seal tape from the inner surface side of the housing to rupture the seal tape, and the ruptured state was evaluated. The gas discharge ports of No. 1 to No. 12 were chamfered at a chamfering angle θ=45 [°] to form chamfered regions. No chamfered region was formed in the gas discharge ports of No. 13 and No. 14 (that is, a chamfering amount X=0 [mm]). Further, the gas discharge ports of No. 1 to No. 13 were formed by drilling, and the gas discharge port of No. 14 was formed by punching (punching with a press machine). In the table of FIG. 12, a numerical value denoted in the column of "φ [mm]" is an opening diameter φ [mm] of the gas discharge port on the inner surface side of the housing. A numerical value denoted in the column of "X [mm]" is a chamfering amount X [mm] of the opening of the gas discharge port on the inner surface side of the housing. A numerical value denoted in the column of "P [%]" is a chamfering percentage P [%].

In the table of FIG. 12, a state when the seal tape was ruptured was denoted in the column of "ruptured state". When the seal tape was integrally punched out along the opening edge of the gas discharge port by shear fracture, "shear" was denoted in the column of "ruptured state". When the seal tape burst by ductile fracture (fracture) (when the film fracture occurred), "fracture" was denoted in the column of "ruptured state".

As shown in FIG. 12, in the case of 2.9 [%]≤P, film fracture of the seal tape occurred. From the above evaluation results, it was confirmed that 2.9 [%]≤P is preferably satisfied.

Other

As described above, the gist of the present embodiment is that the chamfered region of the gas discharge port is formed on the side of the housing to which the seal tape is attached, and the rupture mode of the seal tape is set to ductile fracture. As long as the minimum cross-sectional area A1 is ensured, the formation of the chamfered region of the gas discharge port on the outer side of the housing is not inhibited. Suitable embodiments according to the present disclosure have been described above, but each embodiment disclosed in the present specification can be combined with each feature disclosed in the present specification.

REFERENCE SIGNS LIST

100 Gas generator
1 Housing
13 Gas discharge port
131 Chamfered region
132 Straight region
S1 Seal tape

The invention claimed is:

1. A gas generator, comprising:
an igniter;
a gas generating agent that generates a combustion gas by being combusted in response to actuation of the igniter;
a housing accommodating the igniter and the gas generating agent inside the housing, the housing including an inner surface;
a gas discharge port penetrating through the housing from an inside to an outside of the housing, the gas discharge port including a chamfered region in which a corner portion of an opening of the gas discharge port on the inner surface is removed over an entire circumference of the opening; and
a seal attached to the inner surface of the housing and being configured to close, before the actuation of the igniter, the gas discharge port by covering the opening of the gas discharge port on the inner surface of the housing and open the gas discharge port by being ruptured due to reception of a pressure of the combustion gas generated by the actuation of the igniter.

2. The gas generator according to claim 1, wherein the chamfered region is formed in such a manner to be reduced in diameter with increasing distance from the opening on the inner surface side of the housing in a thickness direction of the housing.

3. The gas generator according to claim 2, wherein an inner wall surface of the chamfered region is formed in a linear shape or a curved shape in a cross section along a thickness direction of the housing.

4. The gas generator according to claim 1, wherein the gas discharge port includes a straight region continuous with the chamfered region and extending with a constant inner diameter.

5. The gas generator according to claim 1, wherein the seal includes a substrate layer made of aluminum and a bonding layer provided on one surface of the substrate layer and configured to adhere to the inner surface of the housing, and a thickness of the substrate layer is equal to or more than 50 μm and equal to or less than 200 μm.

6. The gas generator according to claim 5, wherein the seal has a tensile strength equal to or more than 100 N/20 mm and equal to or less than 200 N/20 mm when the tensile strength is measured in accordance with JIS Z0237.

7. The gas generator according to claim 5, wherein the seal further includes an adhesive layer provided on the other surface of the substrate layer and having adhesion.

8. The gas generator according to claim 1, wherein the gas generator is configured such that, when the seal is ruptured, at least a part of the seal remains in the gas discharge port.

9. The gas generator according to claim 8, wherein the gas generator is configured such that, by the seal being ruptured, a minimum flow path cross-sectional area of a flow path for the combustion gas formed in the gas discharge port becomes smaller than a minimum cross-sectional area of the gas discharge port.

10. A gas discharge method, comprising:

preparing a housing of the gas generator, the housing accommodating, inside thereof, an igniter and a gas generating agent that generates a combustion gas by being combusted in response to actuation of the igniter, the housing including a gas discharge port penetrating through the housing from an inside to an outside of the housing, the gas discharge port including a chamfered region in which a corner portion of an opening on an inner surface of the housing is removed over an entire circumference of the opening;

closing the gas discharge port by attaching a seal to the inner surface of the housing and by covering the opening of the gas discharge port on the inner surface of the housing;

assembling the gas generator;

activating the igniter; and rupturing the seal in such a manner that at least a part of the seal remains at the gas discharge port by pressing the seal against an inner wall surface of the chamfered region with a pressure of the combustion gas generated in response to the actuation of the igniter and by rupturing a region of the seal that is on an inner side of a contact region of the seal, the contact region being a region which is in contact with the inner wall surface of the chamfered region.

11. The gas discharge method for a gas generator according to claim 10, wherein in the preparing the housing, the chamfered region is formed, in the gas discharge port, in such a manner to be reduced in diameter with increasing distance from the opening on the inner surface of the housing in a thickness direction of the housing, and in the rupturing the seal, the seal is bent in such a manner to conform to the inner wall surface of the chamfered region and thus is ruptured.

12. The gas discharge method for a gas generator according to claim 11, wherein in the preparing the housing, the inner wall surface of the chamfered region is formed in a linear shape or a curved shape in a cross section along a thickness direction of the housing.

13. The gas discharge method for a gas generator according to claim 10, wherein in the preparing the housing, a straight region is formed in the gas discharge port, the straight region opening to an outer surface of the housing and extending with a constant inner diameter, and in the rupturing the seal, the seal is bent and ruptured such that at least a part of the seal reaches the straight region.

14. The gas discharge method for a gas generator according to claim 10, wherein in the rupturing the seal, the seal is bent and ruptured such that a minimum flow path cross-sectional area of a flow path for the combustion gas formed in the gas discharge port becomes smaller than a minimum cross-sectional area of the gas discharge port.

15. The gas discharge method for the gas generator according to claim 10, wherein in the closing the gas discharge port, the gas discharge port is closed with the seal including a substrate layer made of aluminum and a bonding layer provided on one surface of the substrate layer and configured to adhere to the inner surface of the housing.

16. The gas discharge method for a gas generator according to claim 10, wherein a plurality of the gas discharge ports are formed in the housing, in the assembling the gas generator, a filter having a tubular shape is disposed inside the housing such that an annular space is formed between the filter and the inner surface of the housing, and in the rupturing the seal, the pressure is applied on the seal while the pressure in the annular space is made uniform by introducing the combustion gas into the annular space, the combustion gas being generated by the actuation of the igniter and passed through the filter.

17. The gas discharge method for the gas generator according to claim 10, wherein in the rupturing the seal, the seal is stretched by the pressure of the combustion gas, and the seal is bent and ruptured while at least a part of the seal remains in the gas discharge port.

* * * * *